United States Patent
Strater et al.

(10) Patent No.: US 10,869,246 B2
(45) Date of Patent: Dec. 15, 2020

(54) METHOD AND SYSTEM FOR PROACTIVE STEERING IN A WIRELESS NETWORK

(71) Applicant: ARRIS Enterprises LLC, Suwanee, GA (US)

(72) Inventors: Jay Strater, San Diego, CA (US); Gregory Nakanishi, San Diego, CA (US); Paul D. Baker, San Diego, CA (US)

(73) Assignee: ARRIS ENTERPRISES LLC, Suwanee, GA (US)

(*) Notice: Subject to any disclaimer, the term of this patent is extended or adjusted under 35 U.S.C. 154(b) by 0 days.

(21) Appl. No.: 16/228,720

(22) Filed: Dec. 20, 2018

(65) Prior Publication Data

US 2020/0205049 A1    Jun. 25, 2020

(51) Int. Cl.
| | |
|---|---|
| *H04W 36/18* | (2009.01) |
| *H04W 36/00* | (2009.01) |
| *H04W 36/08* | (2009.01) |
| *H04B 17/318* | (2015.01) |
| *H04W 28/08* | (2009.01) |

(52) U.S. Cl.
CPC .......... *H04W 36/18* (2013.01); *H04B 17/318* (2015.01); *H04W 36/0094* (2013.01); *H04W 36/08* (2013.01); *H04W 28/08* (2013.01)

(58) Field of Classification Search
CPC . H04W 36/0094; H04W 36/08; H04W 36/18; H04B 17/318
See application file for complete search history.

(56) References Cited

U.S. PATENT DOCUMENTS

| 7,577,453 | B2 | 8/2009 | Matta | |
| 2003/0202492 | A1* | 10/2003 | Akella | ................ H04B 7/216 |
| 2005/0030953 | A1* | 2/2005 | Vasudevan | ............. H04L 12/56 |
| 2009/0054096 | A1* | 2/2009 | Single | .................... H04Q 7/20 |
| 2011/0075556 | A1* | 3/2011 | Li | ........................ H04W 28/08 |
| 2012/0083288 | A1* | 4/2012 | Siomina | ............... H04W 24/00 |
| 2016/0050587 | A1* | 2/2016 | Lam | .................... H04W 28/08 |
| 2016/0073405 | A1* | 3/2016 | Khawer | ............... H04W 72/04 |
| 2016/0226707 | A1* | 8/2016 | Schallich | ................ H04L 12/24 |
| 2016/0242088 | A1 | 8/2016 | Wang et al. | |
| 2016/0352564 | A1* | 12/2016 | Sanda | ................ H04L 41/0659 |
| 2017/0111854 | A1 | 4/2017 | Ho et al. | |
| 2017/0367011 | A1 | 12/2017 | Ekemark et al. | |

OTHER PUBLICATIONS

International Search Report dated Mar. 13, 2020 in International (PCT) Application No. PCT/US2019/067949.

* cited by examiner

*Primary Examiner* — Ronald B Abelson
(74) *Attorney, Agent, or Firm* — Wenderoth, Lind & Ponack, L.L.P.

(57) ABSTRACT

A method for proactive steering of client devices in a wireless network includes identifying, by a network controller, at least two radio resources in a wireless network including a first radio resource and a second radio resource; detecting, by the network controller, a client device connected to the wireless network via an established communication channel with the first radio resource; determining, by the network controller, that the client device is technically capable of establishing a communication channel with the second radio resource; and steering, by the network controller, the client device to establish the communication channel with the second radio resource.

16 Claims, 5 Drawing Sheets

METHOD AND SYSTEM FOR PROACTIVE STEERING IN A WIRELESS NETWORK

FIELD

The present disclosure relates to the proactive steering of client devices in a wireless network, specifically the steering of a client device in a wireless network from a first radio resource to a second performed during downtime without being prompted as a reactionary measure.

BACKGROUND

Many wireless networks offer a variety of different radio resources through which a client device can communicate with the network. In recent times, even small home networks in the smallest apartments and businesses often have several radio resources available, commonly having multiple communication bands available for communication with the network. For example, many routers and other networking devices have both the 2.4 GHz and 5 GHz communication bands available for communication with client devices. For larger networks, there are also often a number of different access points through which a client device may connect to the network.

Typically, when a client device connects to a wireless network it stays connected to the same radio resource that it connects through initially. However, sometimes events occur that can change the strength, quality, or circumstances of the connection of a client device to the network. For example, the client device may be a smart phone that is moving around a large residence, where the device may first connect to an access point near its location and then be moved to the opposite side of the residence. In another example, several devices in a network may all connect through the same access point, creating a prohibitively high amount of traffic that can reduce the bandwidth available to each device.

In these kinds of instances, a network can often be configured, through a network controller, to monitor for such conditions where it may be necessary for a client device to be moved from one radio resource to another, a process referred to in the industry as "steering." For example, a network controller may detect that too many client devices are connected through a single access point and may then steer one or more client devices to another access point. In another example, the strength of a signal between a client device and its radio resource may deteriorate to the point of being detrimental, which may trigger the network controller to steer the client device to a different radio resource with a stronger signal.

When the steering of a client device occurs, it is generally reactionary. In other words, there is first a negative issue with the client device's connection to the wireless network, which prompts the steering of the client device to a different radio resource. Without the detection of such a problem, the client device remains connected through its initial radio resource. However, there may be instances where a better radio resource may be available for a client device even when there is no problem with a device's current connection to the wireless network. Nonetheless, network controllers are typically unable to detect such instances or to perform steering without doing so to correct a preemptory issue. Thus, there is a need for a technical solution where a network controller is able to proactively steer client devices without doing so in response to reactive triggers.

SUMMARY

The present disclosure provides a description of systems and methods for proactive steering of client devices in a wireless network. A network controller will rank radio resources available in its wireless network for priority, where a second radio resource will have a higher priority than a first radio resource, such as due to the communication band used (e.g., a 5 GHz band may provide a better connection than a 2.4 GHz band). During downtime, when the network controller is not actively performing reactive steering, the network controller detects client devices connected to the first radio resource. The network controller goes through each client device and, if the client device is capable of being connected via the second radio resource, it may steer that client device to the second radio resource. The result is that a client device can be proactively steered to a second radio resource in a network without a reactive trigger, thus providing for a better connection even if there was no underlying issue with the initial connection. This provides for a better overall network and better device performance through the new operations introduced to the network controller.

A method for proactive steering of client devices in a wireless network includes: identifying, by a network controller, at least two radio resources in a wireless network including a first radio resource and a second radio resource; detecting, by the network controller, a client device connected to the wireless network via an established communication channel with the first radio resource; determining, by the network controller, that the client device is technically capable of establishing a communication channel with the second radio resource; and steering, by the network controller, the client device to establish the communication channel with the second radio resource.

A system for proactive steering of client devices in a wireless network includes: a client device; a first radio resource; a second radio resource; and a network controller configured to identify the first radio resource and the second radio resource in a wireless network, detect the client device connected to the wireless network via an established communication channel with the first radio resource, determine that the client device is technically capable of establishing a communication channel with the second radio resource, and steer the client device to establish the communication channel with the second radio resource.

BRIEF DESCRIPTION OF THE DRAWINGS

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed descriptions of exemplary embodiments are intended for illustration purposes only and are, therefore, not intended to necessarily limit the scope of the disclosure.

DETAILED DESCRIPTION

System for Proactive Steering of Client Devices

Figure 1:
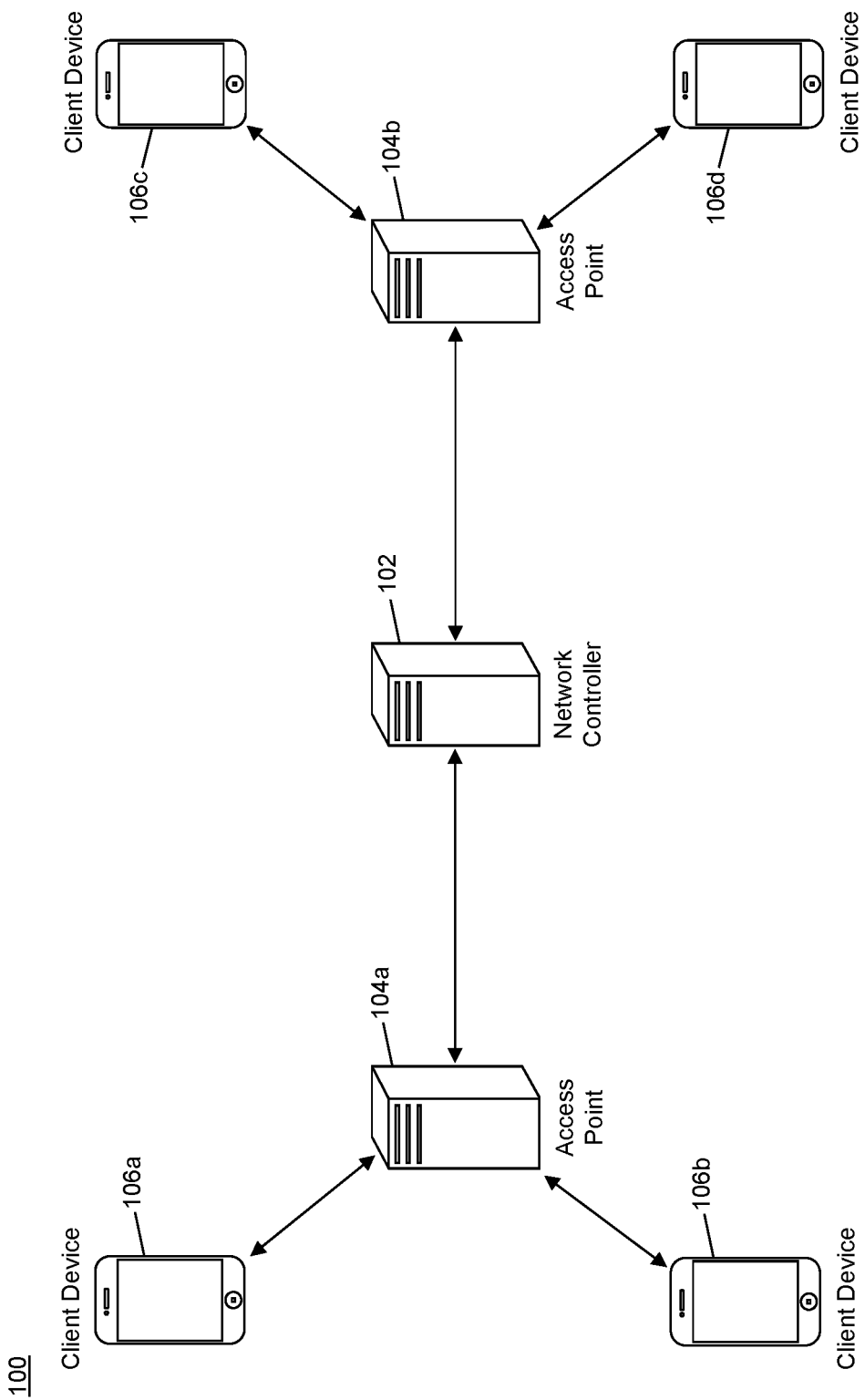
FIG. 1 is a block diagram illustrating a high level system architecture for proactive steering in a wireless network in accordance with exemplary embodiments.

FIG. 1 illustrates a system 100 for the proactive steering of client devices from one radio resource to another in a wireless network.

The system 100 may include a network controller 102. The network controller 102, discussed in more detail below, may be a device connected to a wireless network that is configured to control aspects of the connection of client devices 106 to the wireless network. For example, the network controller 102 may be configured to proactively and reactively steer client devices 106, as discussed in more detail below, as well as perform standard functions of a network controller, such as monitor network traffic, monitor channel utilization, perform topography mapping, maintain a firewall, etc. The network controller 102 may be a stand-alone device that is connected to the wireless network or may be implemented in another device in the wireless network, such as being part of a router, extender, or other networking device. Each of the components illustrated in the system 100 of FIG. 1 may each be connected to or otherwise operate as part of a single wireless network.

In the system 100, the wireless network may include multiple radio resources through which a client device 106 may connect to (e.g., communicate through) the wireless network. A radio resource may be any type of resource or attribute associated with a possible communication channel between the client device 106 and the wireless network. For instance, in the illustrated wireless network of FIG. 1, the wireless network may include multiple access points 104a and 104b, where each access point may be a separate radio resource. In an exemplary embodiment, an access point 104 may have multiple communication bands available, such as a 2.4 GHz band and a 5 GHz band, where each of the communication bands may be a separate radio resource. In some cases, the network controller may consider different types of radio resources to be different radio resources when performing the functions discussed herein. For instance, in a first example, the system 100 may include four radio resources: a 2.4 GHz band for the access point 104a, a 5 GHz band for the access point 104a, a 2.4 GHz band for the access point 104b, and a 5 GHz band for the access point 104b. In a second example, the system 100 may only include two radio resources: a 2.4 GHz band provided by both access points 104a and 104b and a 5 GHz band provided by both access points 104a and 104b.

In the system 100, a plurality of client devices 106 may be connected to the wireless network via the various access points 106 (e.g., in cases where access points 104 are included in a wireless network). Each client device 106 may be connected to the wireless network via a communication channel established with one of the available radio resources. The network controller 102 may be configured to detect and maintain a list of all of the available radio resources in the wireless network. As part of the listing of the radio resources, the network controller 102 may assign a priority order to the radio resources. For instance, a 5 GHz communication band may have a higher priority than a 2.4 GHz communication band due to the various benefits of the type of connection provided thereby.

Traditionally, a network controller 102 may be configured to perform reactive steering. Reactive steering may be checked by the network controller 102 at a predetermined interval of time, such as every five seconds, every ten seconds, every minute, every five minutes, or other suitable time interval. For reactive steering, the network controller 102 may monitor various aspects of the connections between each of the client devices 106 and the wireless network. Such aspects may include signal strength, communication band, traffic amount (e.g., bandwidth used/available), etc. The network controller 102 may also monitor various aspects of the access points 104 as well, such as monitoring the channel utilization of each of the access points 104. The network controller 102 may include criteria, also referred to herein as "triggers," where, when the criteria is met, steering of a client device 106 must be performed. Such criteria may include, for instance, the signal strength of a communication channel between a client device 106 and its access point 104. For example, if the signal strength drops below a certain threshold value, the network controller 102 may reactively steer the client device 106 to a different access point 104. In another example, if the channel utilization in an access point 104 goes above a threshold value, the network controller 102 may reactively steer one or more client devices 106 from that access point 104 to another access point 104 in an effort to balance the load in the wireless network.

The network controller 102 may continue to perform reactive steering for client devices 106 at each predetermined interval. However, there may be cases where it could be beneficial for a client device 106 to be moved from one radio resource to another even if there is no reactive trigger to precipitate such a move. For instance, a client device 106a may be connected to a first radio resource (e.g., a 2.4 GHz communication band connection with the access point 104a) when a second radio resource (e.g., a 5 GHz communication band connected with the access point 104a) is available, but may not be reactively steered to the second radio resource if the client device's connection with the first radio resource is suitable (e.g., no reactive triggers are triggered). In such cases, the network controller 102 may be configured to perform proactive steering.

When the network controller 102 is not performing any reactive steering, the network controller 102 may perform a proactive steering process during the downtime. As part of the proactive steering process, the network controller 102 may detect each of the client devices 106 connected to the wireless network that are connected through a radio resource that is not the highest priority radio resource in the wireless network (e.g., as determined in the list maintained by the network controller 102). For a client device 106 that is not connected to the best (e.g., as determined by priority) available radio resource, or when there is any higher priority radio resource available, the network controller 102 may determine if the client device is capable of being connected to the best, or a better, radio resource. The determination may be based on any data available to the network controller 102, such as through configuration data loaded into the network controller 102 or available via the Internet, by polling the client device 106 to determine its capabilities, or any other suitable method. If a better radio resource is available and the client device 106 is capable of being connected to that radio resource, then the network controller 102 may proactively steer that client device 106 to that better radio resource. The client device 106 may then switch its communication channel with the wireless network from its initial radio resource to that better radio resource, resulting in a better connection to the wireless network even if there were no issues with its initial connection. As a result, the overall performance of client devices 106 in the wireless network is improved. In cases where the client device 106 may not be capable of connecting to the best possible radio resource, the client device 106 may be proactively steered to the highest priority radio resource with which it is capable of communicating.

In some embodiments, the network controller 102 may be configured to perform load balancing as part of the proactive steering. For instance, the network controller 102 may monitor the channel utilization experienced by each of the radio resources. The network controller 102 may predict or estimate traffic amounts or channel utilization that may be experienced following a proactive steering and may adjust the steering accordingly. For example, the amount of channel utilization experienced by the best radio resource in the wireless network may become prohibitively high if every client device 106 is proactively steered to that radio resource. In such a case, the network controller 102 may start to proactively steer client devices 106 to the second best radio resource instead, to balance the load. In some instances, the priority assigned to each of the radio resources may be affected by the current load of that radio resource. In such an instance, the second best radio resource indicated above may be moved in the priority to the highest priority once the channel utilization in the prior best radio resource becomes too high. In these instances, load balancing may be inherent to the proactive steering using the priority listing or radio resources.

In some embodiments, the network controller 102 may maintain an ordered list of client devices 106 in the wireless network, which may be used in the proactive steering. The ordered list may be a list of all client devices 106 connected (e.g., currently, historically, etc.) to the wireless network, where each client device 106 may be ordered according to a priority. The priority may be determined by any suitable criteria, such as amount of bandwidth used by the client device 106, type of device (e.g., 802.11n versus 802.11ac, versus 802.11ax capable device), priority assigned thereto by a user of the wireless network, etc. For instance, a smart television may be given a higher priority than a smart light bulb, due to the amount of traffic necessary for the operation of each, and/or preference of the network user. In some cases, a user may prevent proactive steering (e.g., and/or reactive steering) of a specific client device 106, where it may be removed from the ordered list or indicated accordingly. In embodiments where an ordered list is used, the proactive steering may be performed based on the ordering of the list. For instance, the network controller 102 may first proactively steer the highest client device 106 on the list that is not currently connected to its best possible (e.g., highest priority that the client device 106 is capable of connecting to) radio resource. In some embodiments, additional criteria may be used in the ordering of client devices 106 or performing of proactive steering, such as current operation of the client device 106. For instance, an idle (e.g., traffic to/from the client device 106 is below a predetermined threshold) device may be given a low priority or may be skipped during proactive steering due to the idle status of the client device 106.

In some cases, the proactive steering process may be performed by the network controller 102 only during downtime of other functions. In such instances, the proactive steering process may be interrupted by any other functions that may need to be performed by the network controller 102. For example, if a reactive trigger occurs, the proactive steering process may be stopped so the reactive steering can be performed. In some embodiments, the proactive steering process may be performed at a predetermined interval of time when the reactive steering process is not being performed. In some cases, the interval for the proactive steering process may be greater than the interval for the reactive steering process. For example, the reactive steering process may be performed once every five or ten seconds, while the proactive steering process may be performed once every minute or any available time when other functions (e.g., reactive steering) is not being performed. In some cases, the ordering of radio resources and/or client devices 106 may be performed as part of the respective processes, or may be performed outside of the reactive and proactive steering processes. In latter cases, the ordering may be performed at an interval different than the interval used in performing either steering process.

In some instances, reactive triggers or criteria used for proactive steering may utilize threshold values that may have ranges associated therewith. For instance, a reactive trigger for steering a client device 106 from one radio resource to another if there is a stronger signal with the second radio resource may require that the signal is at least a predetermined amount (e.g., 10%) stronger. The use of ranges, ratios, percentages, and other relative measures for triggers and criteria for reactive and proactive steering may prevent rapid steering of a client device 106 back and forth between two radio resources. Other implementations of hysteresis to prevent rapid steering may be used.

In some embodiments, a wait period may be included in steering operations for client devices 106. In such embodiments, the steering (e.g., both reactive and proactive) of a client device 106 may not be performed for a predetermined period of time following an initial steering operation. For example, if a client device 106 is steered from one radio resource to another, further steering for the client device 106 may be prohibited for the next ten minutes, to prevent repeated steering of the client device 106 that may be detrimental to its connection with the wireless network. In some cases, the network controller 102 may monitor for repeated steers of a client device 106. For instance, if a client device 106 is repeatedly steered back and forth between two radio resources, the network controller 102 may remove the client device 106 from the ordered list for steering to prevent the repeated steering, or may set an increased wait period for that client device 106. In some cases, the network controller 102 may detect if steering is performed by a user (e.g., as opposed to proactive or reactive steering initiated by the network controller 102), such as the user manually adjusting the radio resource through which a client device 106 is connected. In such cases, the network controller 102 may prevent further proactive steering of the client device 106, may increase the wait period of the client device 106, and/or may provide information to the user regarding the proactive steering of that client device 106 through any suitable communication means.

Network Controller

Figure 2:
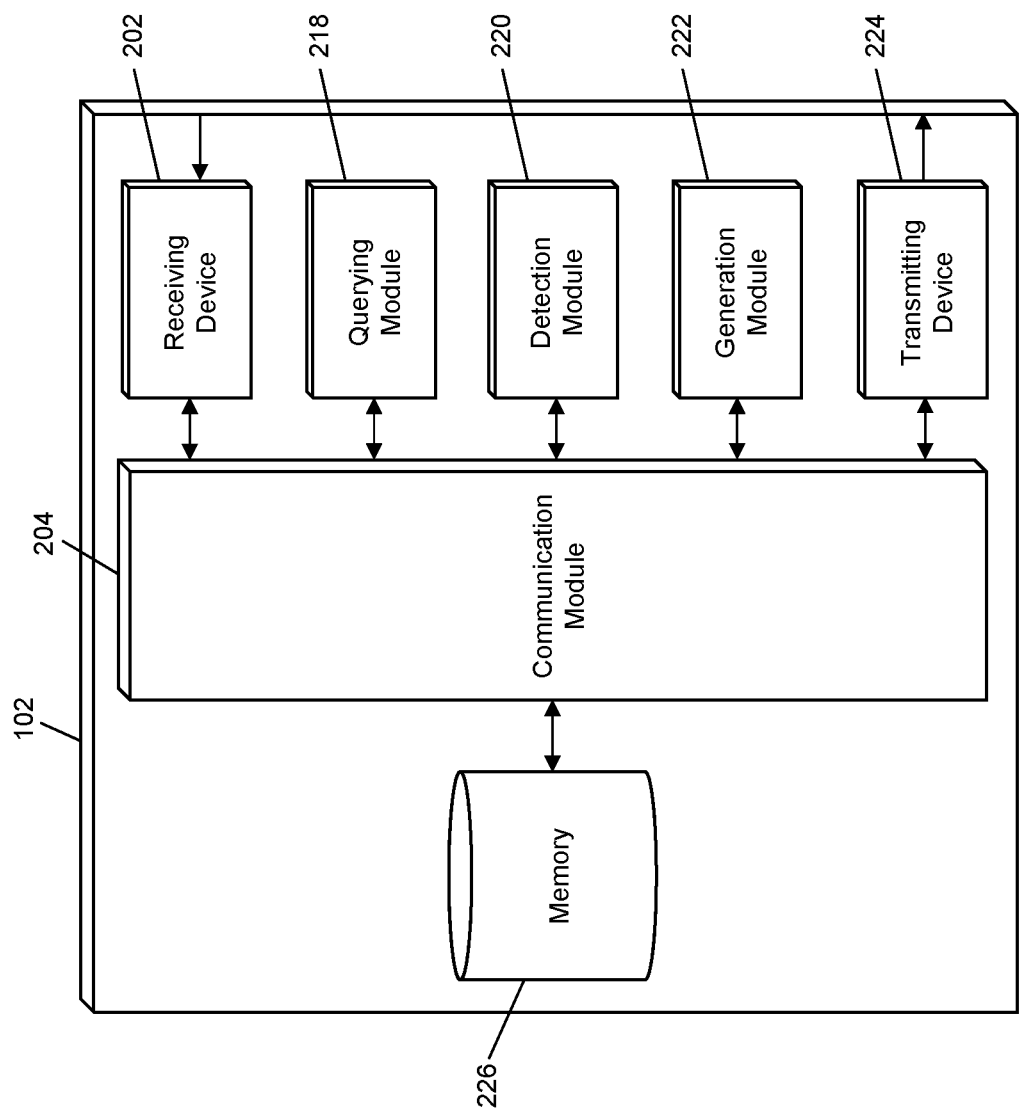
FIG. 2 is a block diagram illustrating the network controller of the system of FIG. 1 for the proactive steering of client devices in a wireless network in accordance with exemplary embodiments.

FIG. 2 illustrates an embodiment of a network controller 102 in the system 100. It will be apparent to persons having skill in the relevant art that the embodiment of the network controller 102 illustrated in FIG. 2 is provided as illustration only and may not be exhaustive to all possible configurations of the network controller 102 suitable for performing the functions as discussed herein. For example, the computer system 500 illustrated in FIG. 5 and discussed in more detail below may be a suitable configuration of the network controller 102.

The network controller 102 may include a receiving device 202. The receiving device 202 may be configured to receive data over one or more networks via one or more network protocols. In some instances, the receiving device 202 may be configured to receive data from client devices 106, access points 104, and other systems and entities via one or more communication methods, such as radio frequency, local wireless networks, wireless networks, cellular communication networks, Bluetooth, the Internet, etc. In some embodiments, the receiving device 202 may be comprised of multiple devices, such as different receiving devices for receiving data over different networks, such as a first receiving device for receiving data over a local wireless network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by access points 104 that are superimposed or otherwise encoded with information regarding available radio resources, traffic data, channel utilization data, status information, etc. The receiving device 202 may also be configured to receive data signals electronically transmitted by client devices 106, which may be superimposed or otherwise encoded with connection information, radio resource capabilities, steering process results, and other data used in performing the functions discussed herein. In cases where the network controller 102 is part of a router or other networking device, the receiving device 202 may also be performed to receive data signals are part of functions performed as part of the networking device, such as receiving data packets for routing within or outside of the wireless network.

The network controller 102 may also include a communication module 204. The communication module 204 may be configured to transmit data between modules, engines, databases, memories, and other components of the network controller 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the network controller 102 and external components of the network controller 102, such as externally connected databases, display devices, input devices, etc. The network controller 102 may also include a processing device. The processing device may be configured to perform the functions of the network controller 102 discussed herein as will be apparent to persons having skill in the relevant art. In some embodiments, the processing device may include and/or be comprised of a plurality of engines and/or modules specially configured to perform one or more functions of the processing device, such as a querying module 218, detection module 220, generation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The network controller 102 may include a querying module 218. The querying module 218 may be configured to execute queries on databases to identify information. The querying module 218 may receive one or more data values or query strings, and may execute a query string based thereon on an indicated database, such as a memory 226, to identify information stored therein. The querying module 218 may then output the identified information to an appropriate engine or module of the network controller 102 as necessary. The querying module 218 may, for example, execute a query on the memory 226 to identify available radio resources and priorities associated therewith, to adjust priorities of radio resources and client devices 106, to identify client devices 106 for proactive steering, etc.

The network controller 102 may also include a detection module 220. The detection module 220 may be configured to perform detections for the network controller 102 as part of the functions discussed herein. The detection module 220 may receive data received by various components of the network controller 102 as input, may perform detections based on the data, and may output results of the detections to other modules or engines of the network controller 102. The detection module 220 may, for example, detect radio resources currently connected to the wireless network, such as access points, extenders, routers, communication bands, etc. The detection module 220 may also be configured to detect client devices 106 that are connected to the wireless network, and, in some cases, may detection additional data associated therewith, such as communication capabilities, hardware specifications, device names, connection status, etc. The detection module 220 may also be configured to detect reactive triggers and data associated therewith, such as by detecting signal strength of client devices 106, channel utilization of access points 104, etc.

The network controller 102 may also include a generation module 222. The generation module 222 may be configured to generate data for use by the network controller 102 in performing the functions discussed herein. The generation module 222 may receive instructions as input, may generate data based on the instructions, and may output the generated data to one or more modules of the network controller 102. For example, the generation module 222 may be configured to generate ordered lists of radio resources in the wireless network, such as detected by the detection module 220, where the ordered list may place a priority on each radio resource based on any suitable criteria. The generation module 222 may also be configured to generate ordered lists of client devices 106, which may have a priority order associated therewith of client devices 106 for steering (e.g., both reactive and proactive). In some cases, the priority order may be based on user instructions and/or pre-established criteria, which may be set by a user, device manufacturer, or other suitable entity. The generation module 222 may also be configured to generate steering instructions for steering client devices 106 to a specific radio resource, such as part of a proactive steering process discussed herein or via a traditional reactive steering process.

The network controller 102 may also include a transmitting device 224. The transmitting device 224 may be configured to transmit data over one or more networks via one or more network protocols. In some instances, the transmitting device 224 may be configured to transmit data to access points 104, client devices 106, and other entities via one or more communication methods, local wireless networks, wireless networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local wireless network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to client devices 106 and access points 104 that are superimposed or otherwise encoded with data requests, such as to request data regarding current established communication channels, channel utilization, bandwidth availability and usage, communication capabilities, radio resource data, and other data that may be used in performing proactive steering as discussed herein. The transmitting device 224 may also be configured to electronically transmit data signals to client devices 106 that are superimposed or otherwise encoded with steering instructions, which may instruct the client device 106 to change its connection to the wireless network to a different radio resource, where the instructions may include information specifying the radio resource and/or information used to establish a communication channel with the specified radio resource.

The network controller 102 may also include a memory 226. The memory 226 may be configured to store data for use by the network controller 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the network controller 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, ordered lists of radio resources, ordered lists of client devices 106, data regarding client devices 106, such as communication capabilities, traffic requirements or statistics, user preferences, etc., predetermined intervals of time for reactive steering and proactive steering, reactive steering triggers, user criteria, steering wait times, steering prohibitions, and other data that may be suitable for performing the functions discussed herein.

Process for Proactive Steering of Client Devices

Figure 3:
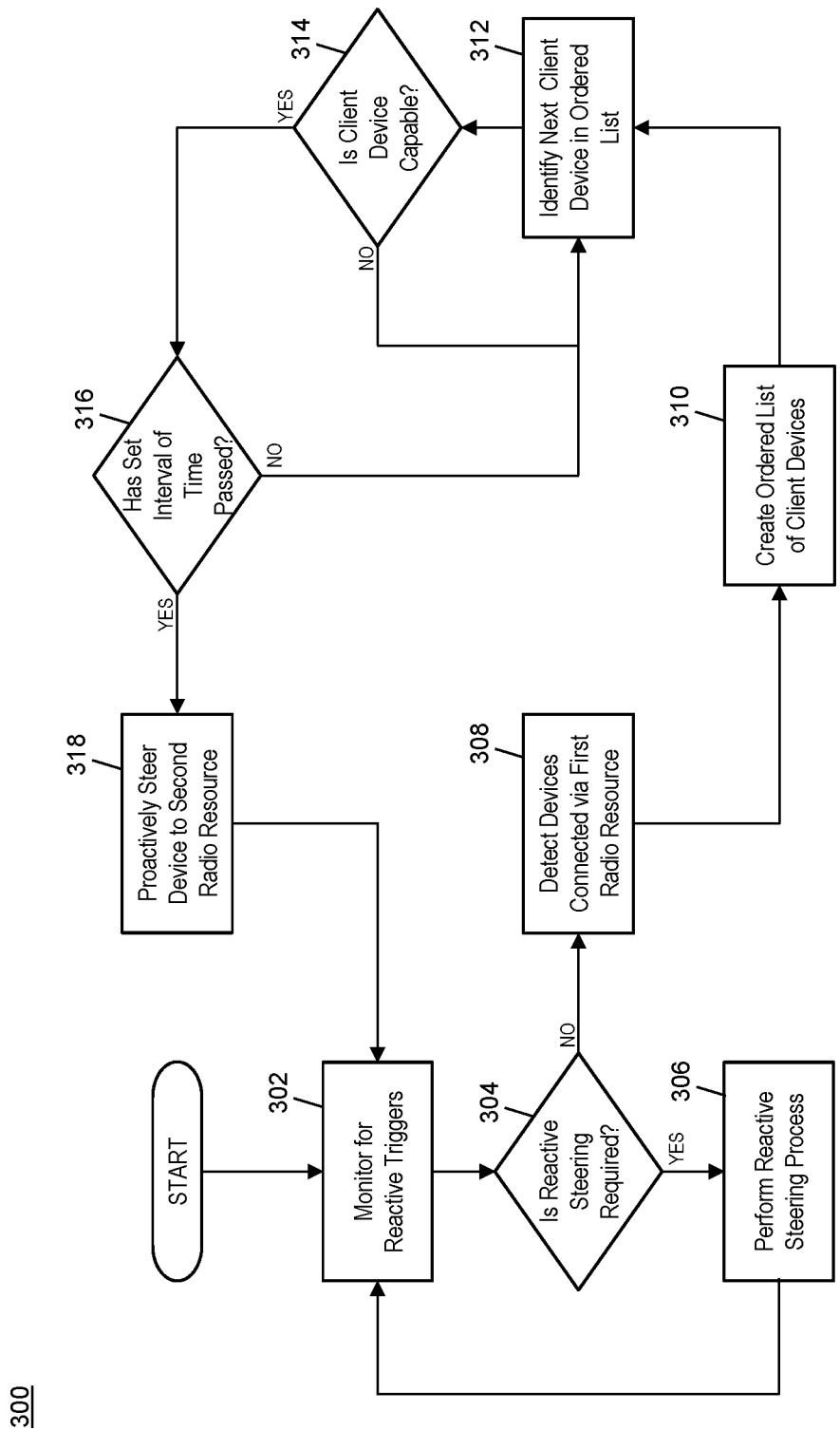
FIG. 3 is a flow diagram illustrating a process for proactively steering client devices in a wireless network executed by the network controller of FIG. 2 in accordance with exemplary embodiments.

FIG. 3 illustrates an example process 300 executed by the network controller 102 in the system 100 of FIG. 1 for the proactive steering of client devices 106 to a higher priority radio resource even in instances where reactive triggers do not occur.

In step 302, the detection module 220 of the network controller 102 may monitor the wireless network to detect the occurrence of any reactive triggers, such as the increase of traffic through an access point 104 or channel utilization beyond an acceptable level or the deterioration of a signal between a client device 106 and an access point 104 beyond an acceptable level. In some cases, the monitoring may occur at a predetermined interval of time. In step 304, the network controller 102 may determine if any reactive steering is required based on the monitoring. For instance, if a reactive trigger has been met, involved client devices 106 may be steered from their current radio resource to an alternative, such as to strengthen the signal of the client device 106 to the wireless network or to reduce the load of traffic going through or the channel utilization of an overloaded access point 104. If a reactive trigger is met, and therefore reactive steering required, then, in step 306, the network controller 102 may perform a reactive steering process to address the reactive trigger. Once the reactive steering process is completed, the process 300 may return to step 302 where the network controller 102 may continue to monitor for reactive triggers.

If there is no current need for reactive steering in the network controller 102 (e.g., no reactive triggers are met as determined in step 304), then, in step 308, the detection module 220 of the network controller 102 may detect client devices 106 that are connected to the wireless network via a first radio resource. In some cases, the detection module 220 may detect all client devices 106 connected to the wireless network and each of the radio resources through which the respective client devices 106 are connected. In step 310, the generation module 222 of the network controller 102 may generate an ordered list of the client devices 106. The ordered list may place the client devices 106 in a priority order for steering based on any suitable criteria, such as user preferences, required or desired bandwidth, average usage time, average idle time, etc.

In step 312, the network controller 102 may identify the next (e.g., first if the process 300 is being performed for the first time) client device 106 in the ordered list. In step 314, the detection module 220 of the network controller 102 may detect if the client device 106 is capable of establishing a communication channel with a second radio resource (e.g., any better radio resource in the ordered list of radio resources based on priority). If the client device 106 is currently connected to its best possible radio resource, then the process 300 may return to step 312 and continue to the next client device 106 in the ordered list. If the client device 106 is capable of communicating via a better radio resource, then, in step 316, the network controller 102 may determine if a predetermined period of time has passed since the last time the client device 106 was steered. The predetermined period of time may vary depending on the client device 106, radio resource that the client device 106 is being steered to or from, or any other suitable criteria. If the time has not passed, the process 300 may return to step 312 (e.g., or step 302 depending on implementation) in order to not excessively steer the client device 106. If the time has passed, then, in step 318, the transmitting module 224 of the network controller 102 may electronically transmit an instruction (e.g., generated by the generation module 222 of the network controller 102) to the client device 106 to steer its connection to the wireless network to be via the second (e.g., or otherwise better) radio resource. The client device 106 may receive the instruction and steer its connection accordingly. Once the instruction has been transmitted, the process 300 may return to step 302 where the network controller 102 may continue to monitor for reactive triggers. In some cases, the process 300 may return to step 312 until a predetermined period of time has expired. For example, the proactive steering (e.g., between steps 308 and 316 or steps 312 through 316) may be repeated for up to one minute before the process 300 returns to step 302.

Exemplary Method for Proactive Steering of Client Devices in a Wireless Network

Figure 4:
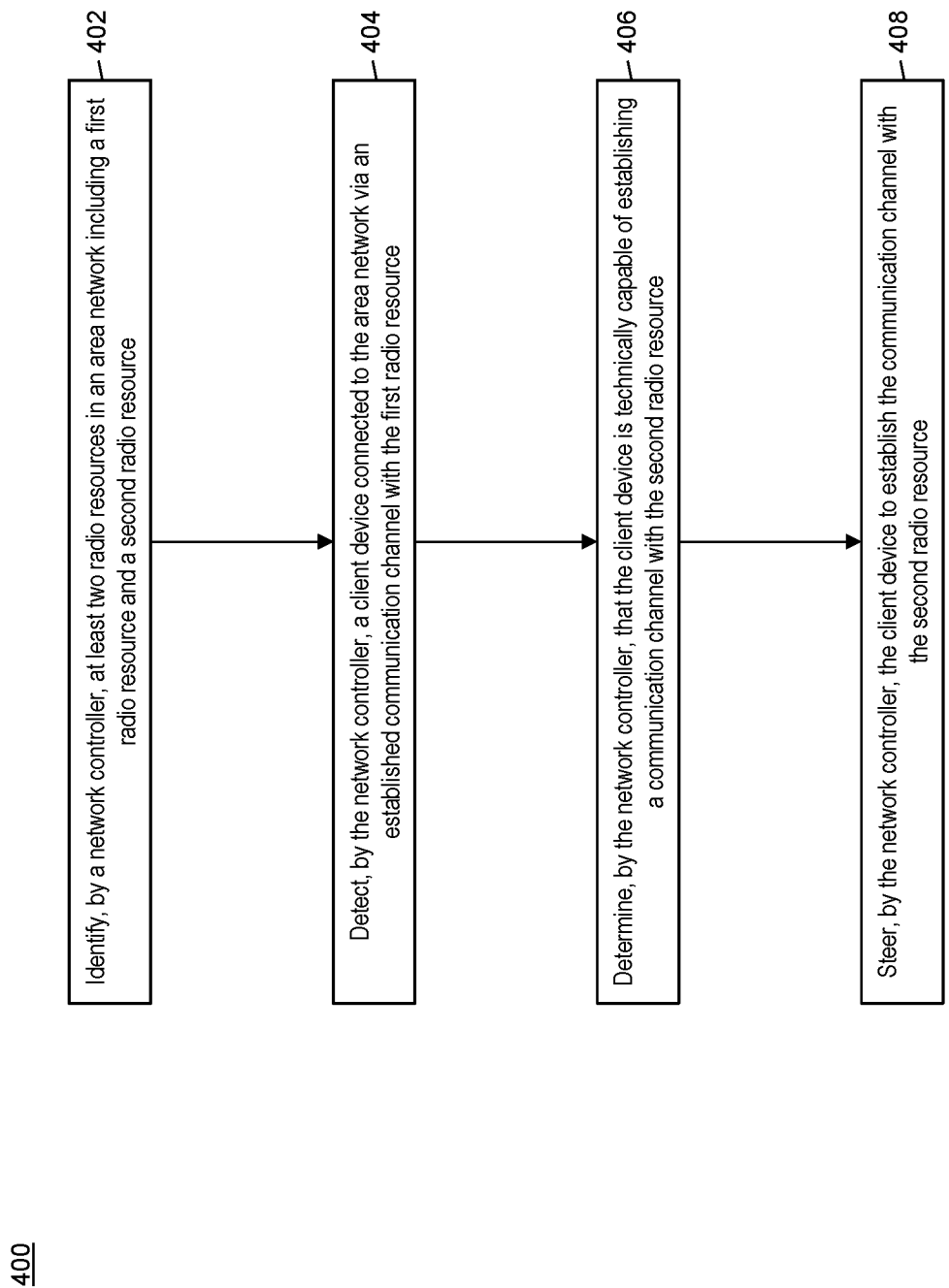
FIG. 4 is a flow chart illustrating an exemplary method for proactive steering of client devices in a wireless network in accordance with exemplary embodiments.

FIG. 4 illustrates a method 400 for the proactive steering of client devices that are connected to a wireless network from a first radio resource to a second radio resource even in cases where a reactive trigger may not occur.

In step 402, at least two radio resources may be identified in a wireless network by a network controller (e.g., the network controller 102) where the at least two radio resources includes a first radio resource. In step 404, the network controller may detect (e.g., via the detection module 220) a client device (e.g., client device 106) connected to the wireless network via an established communication channel with the first radio resource.

In step 406, the network controller may determine (e.g., via the detection module 220) that the client device is technically capable of establishing a communication channel with the second radio resource. In step 408, the network controller may steer the client device to establish the communication channel with the second radio resource.

In one embodiment, the method 400 may further include conducting, by the network controller, a reactive steering process at a predetermined interval of time, wherein steering the client device occurs during downtime of the reactive steering process. In a further embodiment, the method 400 may even further include repeating, by the network controller, the detecting, determining, and steering steps for an additional client device after a predetermined period of time. In an even further embodiment, the predetermined period of time may be greater than the predetermined interval of time.

In some embodiments, the method 400 may also include: repeating, by the network controller, the detecting step to detect a plurality of devices connected to the wireless network; and generating, by the network controller, an ordered list of the devices in the plurality of devices, wherein the client device is first in the ordered list. In a further embodiment, each device of the plurality of devices may be connected to one of a plurality of access points via the first radio resource, each of the plurality of access points may have a channel utilization rating associated therewith based on bandwidth used by the respective access point using the first radio resource, and the ordered list may be ordered based on the channel utilization rating of the access point to which the respective device is connected.

In one embodiment, the first radio resource may be a 2.4 GHz communication band and the second radio resource may be a 5 GHz communication band. In some embodiments, the method 400 may further include identifying, by the network controller, a signal strength rating for the client device with each of a plurality of access points connected to the first radio resource, wherein the client device may be steered to establish the communication channel with the second radio resource via a specific access point of the plurality of access points for which the client device has the highest signal strength rating.

Computer System Architecture

Figure 5:
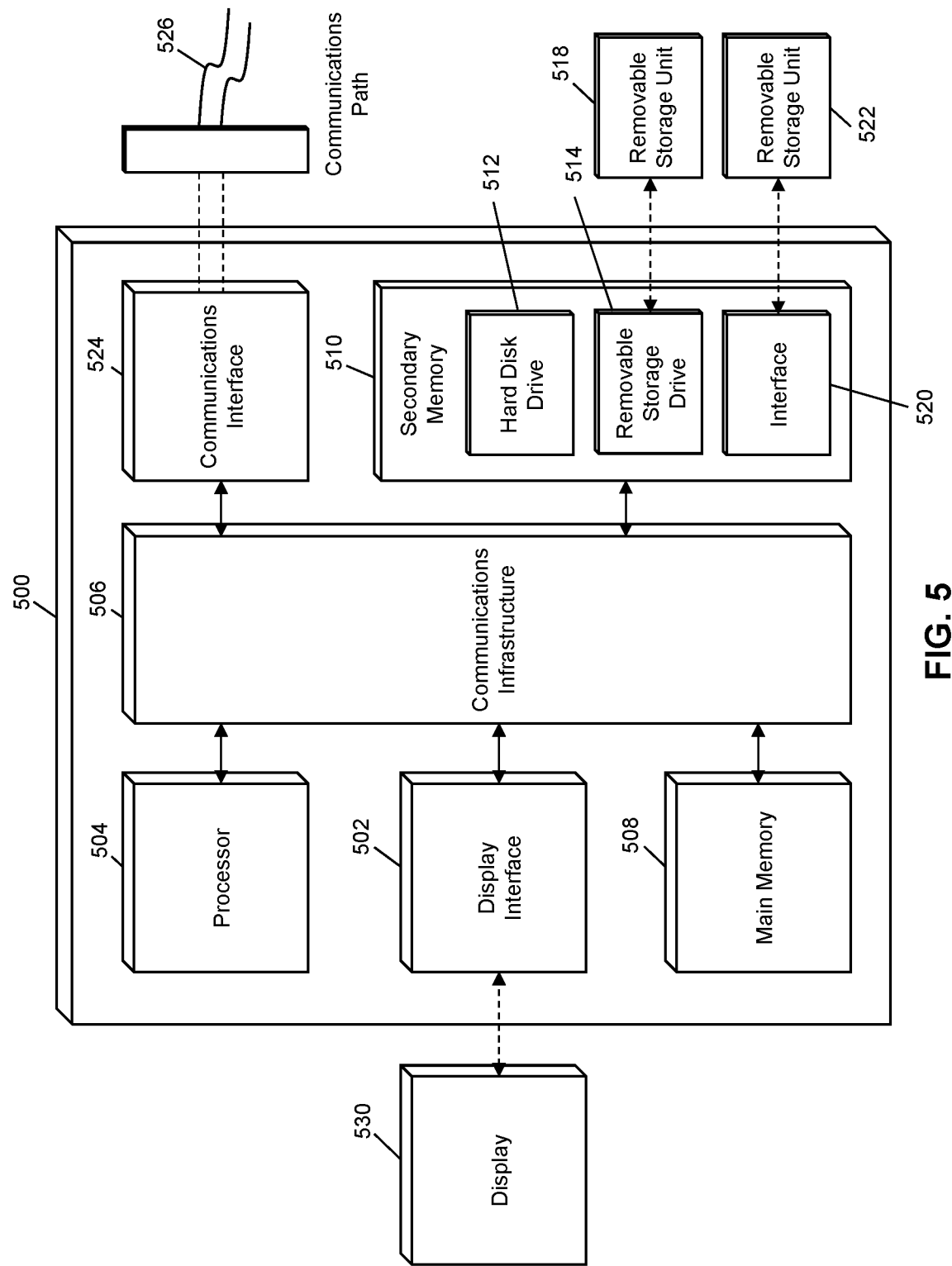
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the network controller 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local wireless network (LAN), a wide wireless network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, Wi-Fi, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for proactive steering of client devices in a wireless network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for proactive steering of client devices in a wireless network, comprising:

identifying, by a network controller, at least two radio resources in the wireless network including a first radio resource and a second radio resource, each of the first radio resource and the second radio resource implementing a different communication band in accordance with a WiFi protocol;

detecting, by the network controller, a client device connected to the wireless network via an established communication channel with the first radio resource;

determining, by the network controller, that the client device is technically capable of establishing a communication channel with the second radio resource; and steering, by the network controller, the client device to establish the communication channel with the second radio resource without relation to a connection issue, wherein the method further comprises repeating, by the network controller, the detecting step to detect a plurality of devices connected to the wireless network; and generating, by the network controller, an ordered list of the devices in the plurality of devices, and wherein the client device is in the ordered list.

2. The method of claim 1, further comprising:

conducting, by the network controller, a reactive steering process at a predetermined interval of time, wherein steering the client device occurs during downtime of the reactive steering process.

3. The method of claim 2, further comprising:

repeating, by the network controller, the detecting, determining, and steering steps for an additional client device after a predetermined period of time.

4. The method of claim 3, wherein the predetermined period of time is greater than the predetermined interval of time.

5. The method of claim 1, wherein the client device is first in the ordered list.

6. The method of claim 1, wherein each device of the plurality of devices is connected to one of a plurality of access points via the first radio resource, each of the plurality of access points has a channel utilization rating associated therewith based on bandwidth used by the respective access point using the first radio resource, and the ordered list is ordered based on the channel utilization rating of the access point to which the respective device is connected.

7. The method of claim 1, wherein the first radio resource implements a 2.4 GHz communication band, and the second radio resource implements a 5 GHz communication band.

8. The method of claim 1, further comprising:

identifying, by the network controller, a signal strength rating for the client device with each of a plurality of access points connected to the first radio resource, wherein the client device is steered to establish the communication channel with the second radio resource via a specific access point of the plurality of access points for which the client device has the highest signal strength rating.

9. A system for proactive steering of client devices in a wireless network, comprising:

a client device;

a first radio resource configured to implement a first communication band in accordance with a WiFi protocol;

a second radio resource configured to implement a second communication band in accordance with the WiFi protocol; and a network controller configured to identify the first radio resource and the second radio resource in the wireless network, detect the client device connected to the wireless network via an established communication channel with the first radio resource, determine that the client device is technically capable of establishing a communication channel with the second radio resource, and steer the client device to establish the communication channel with the second radio resource without relation to a connection issue, wherein the network controller is further configured to repeat the detecting step to detect a plurality of devices connected to the wireless network, and generate an ordered list of the devices in the plurality of devices, and wherein the client device is in the ordered list.

10. The system of claim 9, wherein the network controller is configured to conduct a reactive steering process at a predetermined interval of time, and steering the client device occurs during downtime of the reactive steering process.

11. The system of claim 10, wherein the network controller is configured to repeat the detecting, determining, and steering steps for an additional client device after a predetermined period of time.

12. The system of claim 11, wherein the predetermined period of time is greater than the predetermined interval of time.

13. The system of claim 9, wherein the client device is first in the ordered list.

14. The system of claim 9, wherein each device of the plurality of devices is connected to one of a plurality of access points via the first radio resource, each of the plurality of access points has a channel utilization rating associated therewith based on bandwidth used by the respective access point using the first radio resource, and the ordered list is ordered based on the channel utilization rating of the access point to which the respective device is connected.

15. The system of claim 9, wherein the first communication band of the first radio resource is a 2.4 GHz communication band, and the second communication band of the second radio resource is a 5 GHz communication band.

16. The system of claim 9, wherein the network controller is further configured to identify a signal strength rating for the client device with each of a plurality of access points connected to the first radio resource, and the client device is steered to establish the communication channel with the second radio resource via a specific access point of the plurality of access points for which the client device has the highest signal strength rating.

* * * * *